United States Patent [19]
Diepeveen

[11] Patent Number: 5,397,205
[45] Date of Patent: Mar. 14, 1995

[54] RIVET FASTENER AND METHOD OF INSTALLING

[75] Inventor: Robert J. Diepeveen, Westland, Mich.

[73] Assignee: Ford Motor Company, Dearborn, Mich.

[21] Appl. No.: 172,786

[22] Filed: Dec. 27, 1993

[51] Int. Cl.6 .................. F16B 13/04; F16B 37/04; B23P 11/02
[52] U.S. Cl. ........................ 411/43; 411/69; 411/183; 29/523; 29/525.2
[58] Field of Search ............ 411/43, 69, 70, 173, 411/177, 178, 183, 271, 325; 29/523, 524.1, 525.2

[56] References Cited

U.S. PATENT DOCUMENTS

| | | |
|---|---|---|
| 1,391,447 | 9/1921 | Baron .......................... 411/271 |
| 2,036,551 | 4/1936 | Stevens ...................... 411/271 X |
| 2,083,831 | 6/1937 | Cozzens ..................... 411/217 X |
| 3,193,858 | 7/1965 | Kahn .......................... 411/178 X |
| 3,319,690 | 5/1967 | Rosan et al. .................... 411/178 |
| 4,642,010 | 2/1987 | Bradley et al. ................ 411/70 X |

Primary Examiner—Neill R. Wilson
Attorney, Agent, or Firm—Daniel M. Stock; Roger L. May

[57] ABSTRACT

A fastener is provided for joining two components together, particularly advantageous with respect to aluminum components, in which a nut insert is secured within the components and a rivet is inserted into the nut. After insertion of the rivet into the nut, the rivet is offset to conform to the internal threads of the nut, and when a tool receiving bit is included on the outer face of the rivet, threaded removal of the rivet and disassembly of the components can be effected.

9 Claims, 1 Drawing Sheet

RIVET FASTENER AND METHOD OF INSTALLING

BACKGROUND OF THE INVENTION

1. Technical Field

The present invention relates to fasteners in general and in particular to rivet-like fasteners for joining two parts, particularly aluminum parts.

2. Description of the Prior Art

In joining a pair of aluminum parts together, it is well-known in the prior art to provide a threaded insert of harder material in one of the parts for receiving a threaded male fastener through the other part into threaded engagement with the insert for clampingly securing the two parts together. It is also known to join to such parts together through mechanical deformation rivets, commonly referred to as pop rivets, which utilize a rivet with a shell and a mandrel which deforms the shell into press fit engagement with one or both of two parts to be joined together.

The former method of joining the parts together using threaded inserts and fasteners is relatively expensive to fabricate and necessitates machinery and tooling for handling the engagement of the threaded fastener which is relatively complex and expensive itself.

The latter method employing rivet connection is simpler and less expensive both in terms of the outlay for the attaching fastener and in the type of machinery and tooling needed to effect engagement of the rivet with the components to be joined. Disadvantageously, however, the latter method cannot be readily disassembled without destroying the fastener and without risk of damage to the joined components. While the former method readily permits such disassembly, its other disadvantages militate against its use.

It is accordingly considered desirable that a fastening system be devised which combines the benefits of the threaded and riveted fastening systems of the prior art described above.

SUMMARY OF THE INVENTION

The desire to devise such fastening system is satisfied in the present invention in which there is provided a fastener for joining two aluminum components which employs a nut received in an aperture spanning the two components and a rivet shell and mandrel assembly inserted into the nut and deformed into threaded engagement with the nut through axial loading of the mandrel of the rivet.

According to a further feature of the present invention, the rivet shell includes threads formed on its outer diameter to facilitate the threaded engagement between the nut and the rivet shell.

BRIEF DESCRIPTION OF THE DRAWINGS

The advantages of the present invention will be apparent to those skilled in the fastening arts by reading the following description with reference to the accompanying drawings, in which.

DESCRIPTION OF THE PREFERRED EMBODIMENT

Figure 1:
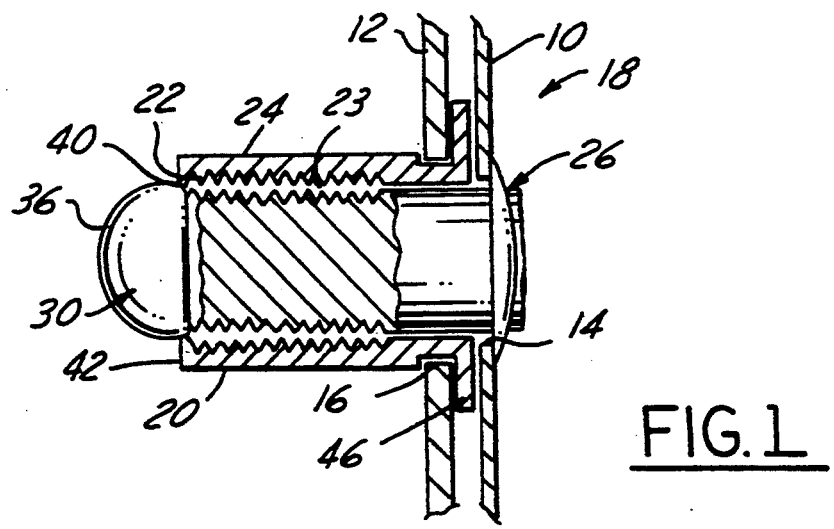
FIG. 1 is a cross-sectional view showing the fastener of the present invention installed to join two components.

Turning now to the drawings, and in particular to FIG. 1 thereof, a pair of components 10, 12, illustrated here as plates, are arranged having apertures 14, 16 formed therethrough in aligned fashion to receive the invention fastener indicated generally at 18. The fastener 18 includes a relatively deformable nut insert 20 having internal threads 22 and an outer diameter 24 received within the bores 14, 16. Carried within the nut 20 is a rivet assembly 26 which includes a rivet shell 28 and a rivet mandrel 30. An outer diameter 32 of the shell 28 may be smooth as illustrated in FIG. 1, or may be threaded. At one end of the mandrel 30, an enlarged head portion 36 includes a shoulder surface 38 that abuttingly engages the end 40 of the shell 28. For some applications, the enlarged head portion 36 may be further enlarged to similarly abuttingly engage the end 42 of the nut 20.

The rivet assembly 26 is preferably of the type commonly referred to as a pop rivet and it includes an annular flange portion 44 on the shell portion 20 for abutting engagement against the component 10 or a similar annular flange 46 which may be provided on the nut 20, as shown in FIG. 1.

Figure 2:
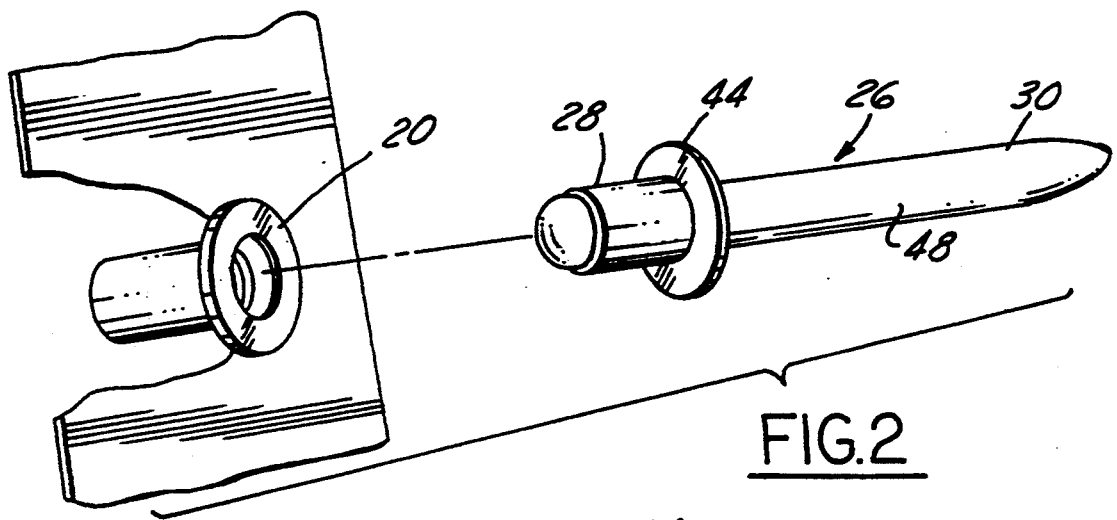
FIG. 2 is an exploded view showing the mandrel and shell components of the rivet separately from the nut.

After insertion of the nut 20 into the bores 14, 16, the rivet assembly 26 is inserted into the nut 20 and an appropriate tool is used to grip the stem 48 (FIG. 2) of the mandrel 30 while urging it toward the components 10, 12. Drawing the stem 48 rightwardly, as viewed in FIG. 1, loads the enlarged portion 36 against the shell 28, and in certain application the shell 28 and the nut 20, deforming them both in columnar fashion. The shell 28 is preferably chosen to be fabricated from a soft material, and deforming it outwardly effects engagement with the internal threads 22 of the nut 20 to define threaded engagement therebetween as indicated at 23 in FIG. 1. Further, if the nut 20 is similarly deformable, engagement of the enlarged head 36 against the nut 20 may effect columnar deformation which deforms the nut into press fit engagement with one or both of the bores 14, 16.

Figure 3:
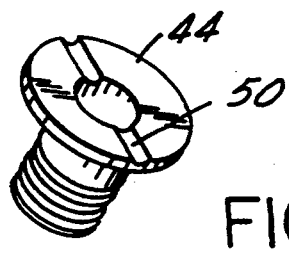
FIG. 3 is a perspective view of the rivet shell of the fastener of the present invention in its formed condition.

As may best be seen in FIG. 3, a tool receiving slot may be provided on the flange 44 of the shell 28. This facilitates rotation of the rivet 26 so that removal of the rivet 26 from the nut 20 and consequent removal of the plate 10 from the plate 12 can be effected.

While only two embodiments of the fastener of the present invention have been disclosed, others may be possible which do not depart from the scope of the following claims.

What is claimed is:

1. A fastener for joining two components, at least one of which is fabricated from aluminum, comprising:

means defining aligned apertures spanning the two components;

a nut having a threaded inside diameter received in the aperture in one of the components, and mounted axially fixed with respect thereto;

a rivet shell received in the nut within the inside diameter thereof and having an inside diameter concentric with the inside diameter of the nut and having a flange abuttingly engageable with the other of said components; and an elongated rivet mandrel received within the central inside diameter of the rivet shell and having a head portion having a larger outside diameter than the central inside diameter of the shell and operative to deform the rivet shell outwardly to effect threaded engagement with the nut and to urge the components together upon application of a predetermined force axial of the rivet mandrel.

2. A fastener as defined in claim 1 wherein the rivet mandrel is further operative to deform the nut into press fit engagement with one of the components.

3. A fastener as defined in claim 1, and further comprising means defining threads formed on the outside diameter of the rivet shell.

4. A fastener as defined in claim 1, and further comprising means defining a tool receiving portion on the rivet shell for facilitating rotating movement of the shell with respect to the nut for removal therefrom.

5. A method of joining two components, comprising:

forming a pair of aligned bores spanning the components;

inserting a nut into the bores in axially fixed relationship with respect to the components;

assembling a rivet having a shell and mandrel;

inserting the rivet into the nut; and forming the rivet shell to threadingly engage the nut and to axially secure the two components between the nut and the rivet.

6. The method of claim 5, and further comprising forming external threads on the rivet shell prior to the insertion step.

7. The method of claim 5, and further comprising the step of forming the nut to engage the components in press fit engagement within the bores.

8. The method of claim 5, wherein the first forming step is effected through axially loading the rivet mandrel.

9. The method of claim 6, wherein the first forming step is effected through axially loading the rivet mandrel.

* * * * *